No. 606,956. Patented July 5, 1898.
J. D. BARRY.
TOOL HANDLE.
(Application filed Feb. 7, 1898.)
(No Model.)

Witnesses
D. H. Blakelock
John Richard Wilson

Inventor
J. D. Barry,
by Wilkinson & Fisher,
Attorneys.

UNITED STATES PATENT OFFICE.

JEFFERSON D. BARRY, OF MARLIN, TEXAS, ASSIGNOR OF ONE-HALF TO
A. L. BRANSON, OF SAME PLACE.

TOOL-HANDLE.

SPECIFICATION forming part of Letters Patent No. 606,956, dated July 5, 1898.

Application filed February 7, 1898. Serial No. 669,391. (No model.)

*To all whom it may concern:*

Be it known that I, JEFFERSON D. BARRY, a citizen of the United States, residing at Marlin, in the county of Falls and State of Texas, have invented certain new and useful Improvements in Tool-Handles; and I do hereby declare the following to be a full, clear, and exact description of the invention, such as will enable others skilled in the art to which it appertains to make and use the same.

My invention relates to improvements in handles for hoes, rakes, and similar agricultural or mechanical implements; and it consists in the novel devices hereinafter described and claimed.

My invention will be clearly understood by reference to the accompanying drawings, wherein the corresponding parts are indicated by the same letters throughout the several views.

Figure 1:
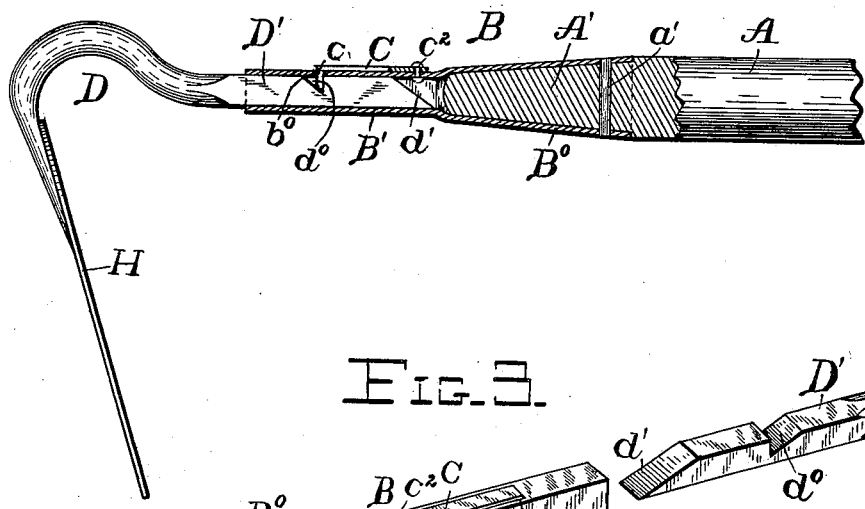
Figure 3:
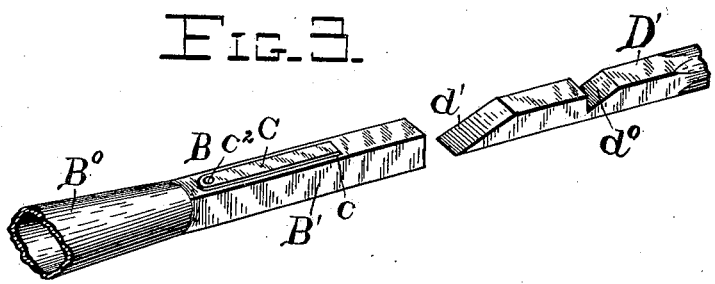
Figure 2:
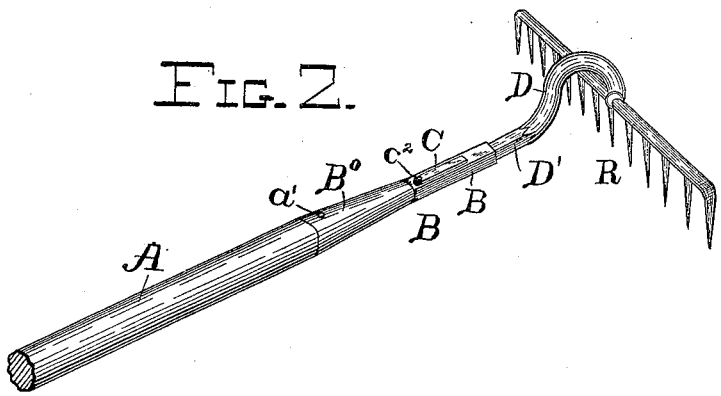

Figure 1 represents a sectional elevation of a hoe and handle embodying my invention. Fig. 2 represents a perspective view of a rake provided with a handle similar to that shown in Fig. 1, and Fig. 3 is a view of the ferrule and shank detached.

A represents a wooden handle of the ordinary construction, having one end reduced slightly and tapered, as seen at A' in Fig. 1, to fit the flaring socket $B^0$ of the connection or ferrule B. The said handle is secured in the said socket by means of a rivet or pin $a'$ or in any other similar or suitable way. The hollow connection or ferrule B has a straight squared portion B' for the reception of the shank of the tool, the latter being indicated by D'. This shank D' forms an integral continuation of the curved "gooseneck" D, which is in turn formed integral with or rigidly connected to the tool, such as a hoe, as indicated by the letter H in Fig. 1, or a rake, as indicated by the letter R in Fig. 2. The said shank D' is straight and squared to fit snugly within the squared socket B'. The end of the said shank is beveled or tapered, as shown at $d'$, to allow the said shank to be inserted past the catch $c$. This catch $c$ is formed by bending at right angles one end of the spring-arm C, the other end of which is fixed, as at $c^2$, to the outside of said socket B'. The said catch extends through a slot or opening $b^0$ in the upper side of said socket and when the tool-shank has been inserted takes into a niche $d^0$ in the upper side of said shank, as seen most clearly in Fig. 1.

The catch $c$ is disengaged from the tool-shank by the workman grasping the spring-arm in the manner of opening a knife-blade.

In inserting the tool into the handle it will not be necessary for the workman to touch the catch, inasmuch as the latter will be wedged upward by the beveled point $d'$ of the tool-shank and will automatically engage in the niche $d^0$ therefor when the shank has been inserted to its proper length.

While I have illustrated and described merely a hoe and a rake, I do not wish to be understood as limiting my invention to such implements, as it will be obvious to any ordinary mind that the said invention will be equally efficient with a number of tools of various sorts provided with a shank that can be fitted into a socket of the character described after the manner of many tools and implements now commonly in use for agricultural or mechanical purposes.

It will also be obvious that a handle constructed according to this invention may be used with a great variety of interchangeable tools, each of which would be provided with a shank adapted to fit the ferrule of the handle, as hereinbefore described, and the advantages of such an arrangement, arising through cheapness and convenience, will be readily appreciated.

Having thus described my invention, what I claim, and desire to secure by Letters Patent of the United States, is—

1. The combination of a handle, a ferrule adapted to fit upon the end of said handle, said ferrule being provided with an extension having a squared inner passage and further provided with a slot in one of the walls of said extension, a spring-arm rigidly attached at one end to said ferrule and bent at its opposite end at right angles, forming a catch, said catch entering said slot, a tool having a squared shank adapted to closely fit the passage in said ferrule, said shank having a notch on one side to engage the end of the spring-catch, substantially as described.

2. The combination of a handle having a flaring cylindrical end, a ferrule having one end adapted to fit upon said handle, and having an extension provided with a squared inner passage and a slot in one of the walls of said passage, a spring-arm rigidly attached at one end to said ferrule and bent at right angles at the other end, forming a catch with a beveled end which passes through said slot, and a tool provided with a squared shank, said shank being adapted to closely fit the passage in said ferrule, having a notch in one side which closely fits the end of the spring-catch and having a beveled end, substantially as described.

In testimony whereof I affix my signature in presence of two witnesses.

JEFFERSON D. BARRY.

Witnesses:
  LAWRENCE S. ROSS, Jr.,
  BENJAMIN H. RICE.